United States Patent [19]

Tzeng

[11] Patent Number: 4,747,780

[45] Date of Patent: May 31, 1988

[54] MULTI-FUNCTION GLOBE WITH ITS RELATED PLANETS

[76] Inventor: Shui-Tan Tzeng, 11-1 F 80, sec. 2, Chang An E. Rd., Taipei, Taiwan

[21] Appl. No.: 918,790

[22] Filed: Oct. 14, 1986

[51] Int. Cl.$^4$ .............................. G09B 27/02
[52] U.S. Cl. ...................... 434/293; 434/292
[58] Field of Search .................. 434/292, 293, 290

[56] References Cited

U.S. PATENT DOCUMENTS

| | | | |
|---|---|---|---|
| 66,791 | 7/1867 | Campbell | 434/293 |
| 221,838 | 11/1879 | McBride | 434/293 |
| 320,999 | 6/1885 | Berneike | 434/292 |
| 549,963 | 11/1895 | Holbrook | 434/293 |
| 578,108 | 3/1897 | Laing | 434/292 |
| 583,540 | 6/1897 | McDonald | 434/292 |
| 635,175 | 10/1899 | Mowery | 434/293 |
| 806,839 | 12/1905 | Rempe | 434/292 |
| 854,513 | 5/1907 | Martin | 434/292 |
| 1,131,263 | 3/1915 | Park | 434/293 |
| 1,135,204 | 4/1915 | Park | 434/292 |
| 1,271,104 | 7/1918 | Van Syckle | 434/292 |
| 1,750,505 | 3/1930 | Bulka | 434/293 |
| 2,797,500 | 7/1957 | Fisk | 434/292 |

*Primary Examiner*—John E. Murtagh
*Assistant Examiner*—Caroline D. Dennison
*Attorney, Agent, or Firm*—Angelo Notaro

[57] ABSTRACT

It is a multi-globe system including the sun, the earth and the moon, and it mainly comprises a supporting frame, a power operation structure, an earth orbit base, a moon transmission structure, a sun structure, an earth structure, a calendar device, and a power supply device; it is substantially a mechanical transmission theory system so as to provide an artificial globe system to illustrate the revolution relation among the earth, the sun and the moon for teaching purpose, and to include a perpetual calendar system.

4 Claims, 9 Drawing Sheets

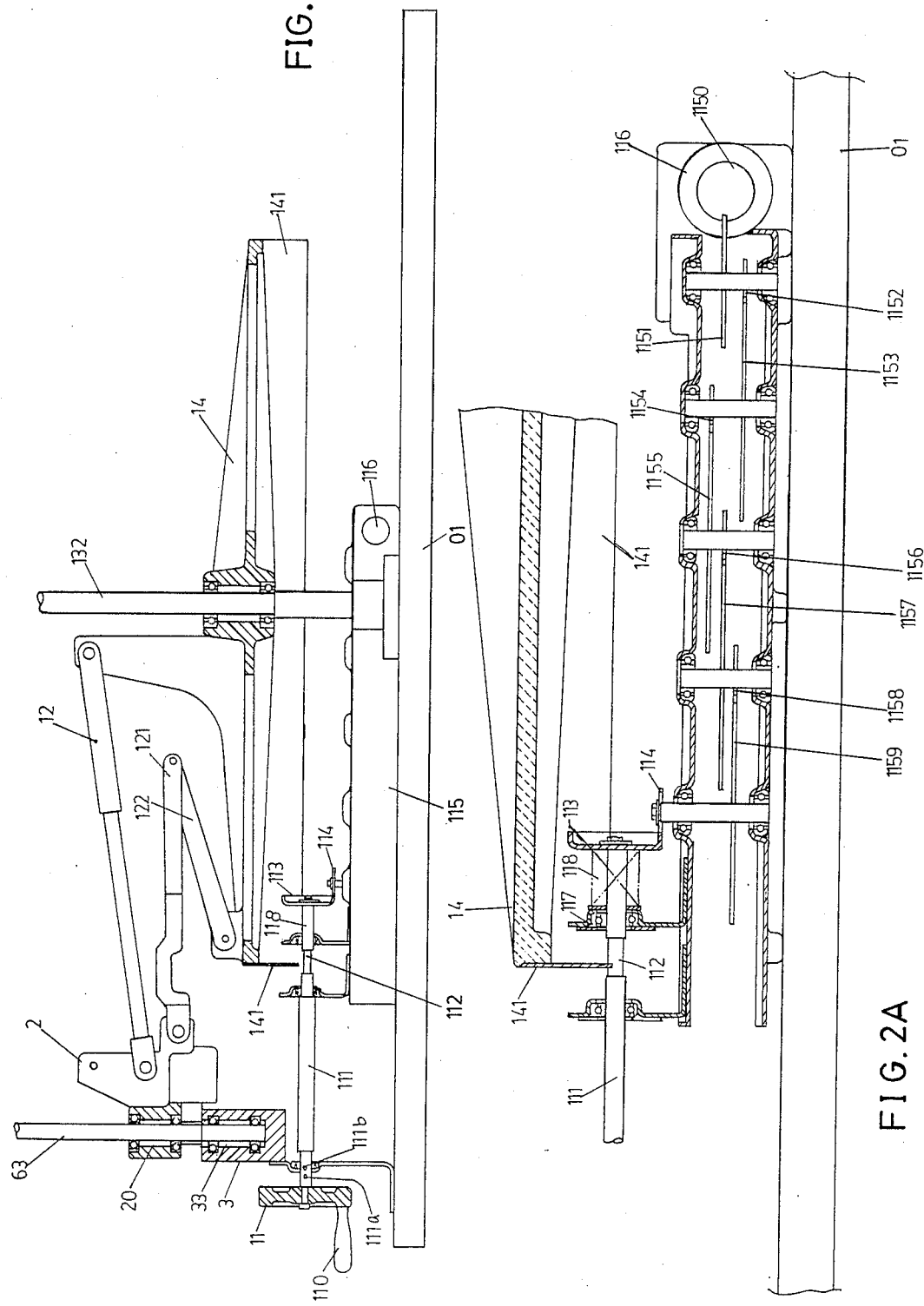

MULTI-FUNCTION GLOBE WITH ITS RELATED PLANETS

BACKGROUND OF THE INVENTION

This invention is substantially a device designed by utilizing a mechanical transmission theory, and it provides a mock-up globe system resembling the revolution and rotation relation among the sun, the earth, and the moon for teaching purposes. Moreover the device can also provide the function of a perpetual calendar to indicate the current date, and week day.

The secrets and wonder of the universe have long been studied by scientists; all over the world. In the universe, the planets that have the closet relationship with human beings are the sun, the moon and the earth. Therefore those three planets have been studied and discussed from many generations ago up to the present time. Finally, relationships of rotation and revolution among these planets, were discovered as were the reasons why we have four seasons per year, day and night. All those complicated phenomena and revolution relations have been written about in many books in various generations. However, it is deemed insufficient to describe those complicated phenomena by merely using words or charts or tables. As a result, average people can only understand a little about the solar system, and that limited knowledge has hindered the development of astronomy and the use thereof. Therefore, the inventor has, through many years of study, developed a device to describe the relations amoung these three planets by means of a mechanical structure with the sizes of the planets being reduced considerably so as to facilitate teaching, and to let the students have a concrete idea of the system by seeing a model of it according to the present invention. In this way, a better teaching result can be achieved.

SUMMARY OF THE INVENTION

This invention provides a mock-up globe system to illustrate the synchronous revolution and rotational relationships among three planets (the earth, the sun and the moon).

It is an object of the present invention to provide a mock-up globe system by means of a mechanical transmission structure so as to illustrate the related positions among the planets and the revolution and rotation relations among them, and also to show the seasons, the day and the night in order to facilitate teaching.

It is another object of the present invention to provide a globe system that can indicate the current time zones among longitude lines on the earth.

It is a further object of the present invention to provide a globe system that can illustrate the date and the week days as a perpetual calender does.

The embodiment of the present invention mainly comprises a supporting france, a power operation structure, a revolution transmission structure, an earth orbit base, a moon transmission structure, a sun structure, an earth structure, a calendar device, and a power supply. In the power operation structure, a manual operation system or an electromotive operation system can drive a driven frame to rotate it; then, through the revolution transmission structure, the rotary force will drive the earth to rotate it and to cause it to revolve about the sun; simultaneously, the sun will rotate with the revolution of the earth. A glass face of the sun body always faces the earth so as to resemble the real sun radiating towards the real earth. A sloping and oblong earth orbit base is used for guiding the earth to revolve about the sun. The moon can revolve about the earth by means of a mechanical transmission structure. By means of a calender disc and the rotation of a linking rod, the date and week days can be indicated through a window on the linking rod. The mock-up globe system according to the present invention not only can show the revolutional and positional relations among the three planets, but also can indicate the seasons, the date, the week days, and the time zones among the longitude lines.

Moreover, another breakthrough of the present invention is that it has corrected the idea that the earth revolves about the sun at a slanting angle of 23½. Instead, the earth's revolution orbit is shown at a slanting angle at 66½ to the axis of the earth. With the earth revolving about the sun along the sloping orbit, the sun shine radiation angle on the earth can be shown at any point (i.e., each of the 360°) so as to show exactly the seasons on the earth. In a conventional globe system, only four points are shown to stand for the positions of the four seasons.

BRIEF DESCRIPTION OF THE DRAWINGS

FIG. 2 illustrates the power operation structure of the embodiment of the present invention.

FIG. 2A is a sectional view of the transmissions gear train shown in FIG. 2.

DETAILED DESCRIPTION

The embodiment of the present invention mainly comprises a supporting frame, a power operation structure, a revolution transmission structure, an earth orbit base, a transmission structure of the moon, a sun structure, an earth structure, a calendar device, and a power supply.

The supporting frame includes an oblong base board 01, several legs 02, and several horizontal frames 04. The supporting frame is used for mounting and supporting other parts of the present invention; the lower ends of the legs 02 are mounted with castors 03 respectively so as to make the device movable (as shown in FIG. 1A).

Figure 3:
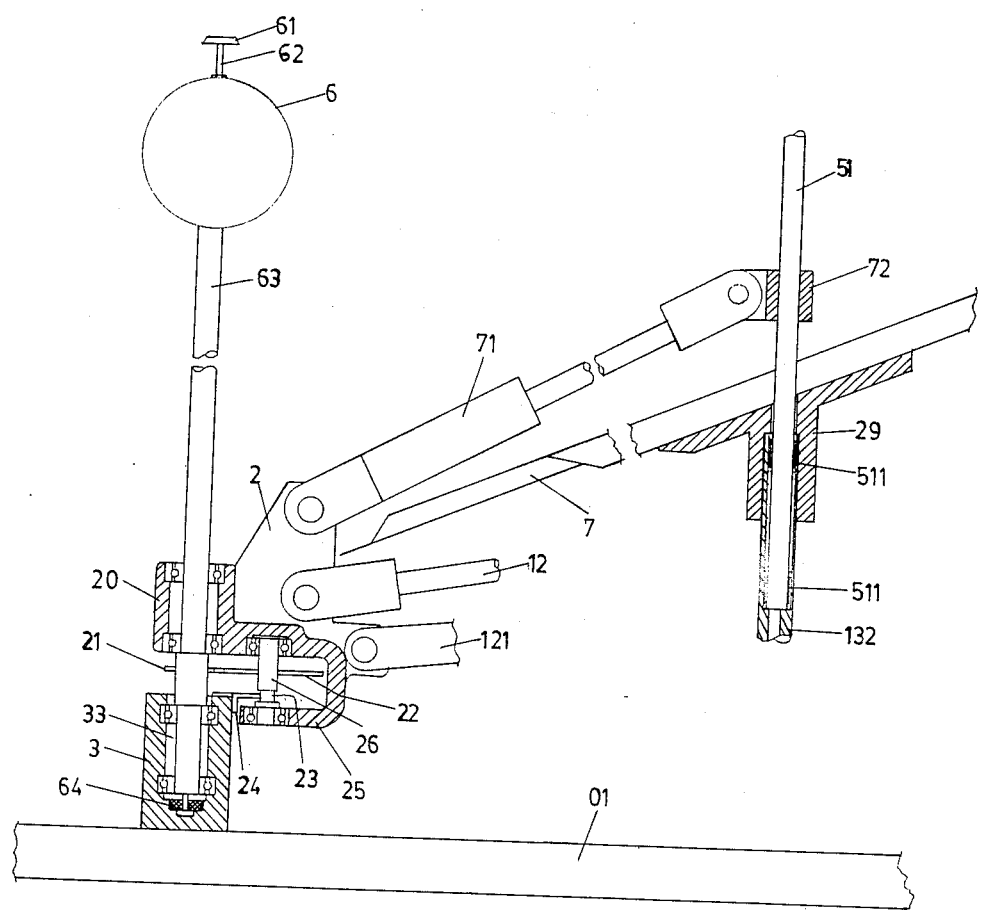
FIG. 3 illustrates the revolution transmission structure of the embodiment of the present invention.
Figure 6:
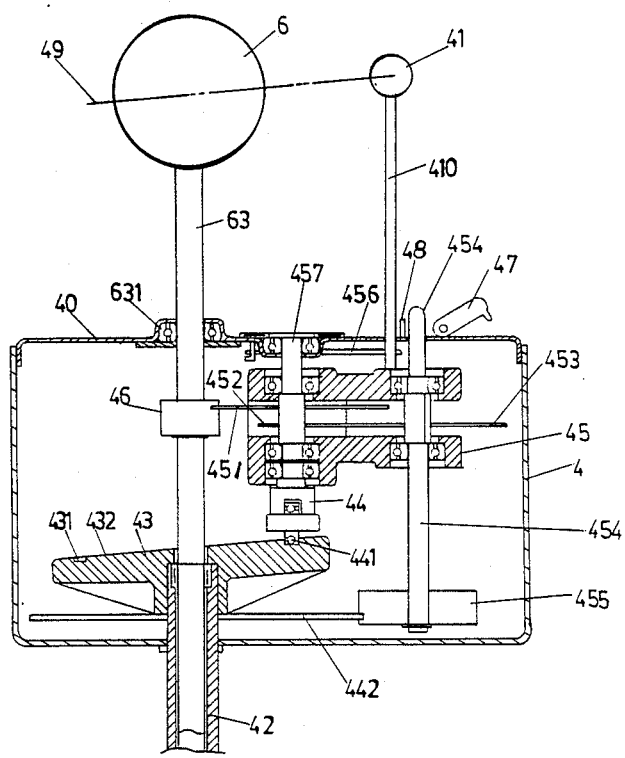
FIG. 6 illustrates an embodiment of a transmission mechanism of the moon planet according to the present invention.

FIG. 2 illustrates a power operation structure, which mainly includes a manual operation system including a hand wheel 11 and other parts, and an automatic operation system including a speed varying D.C. motor 116 and other parts. In the manual operation system, one end of the rotary shaft 111 is fixedly mounted to the hand wheel 11 having a handle 110. In the middle portion of the rotary shaft 111, there is a shaft gear 112 to engage with the gear plate 141 of the rotary disc 14 mounted on the rotary disc shaft 132 so as to cause the rotary disc 14 to turn around the rotary disc shaft 132. However, the aforesaid turning operation can be operated only when the vertically engaged gear 113 is disengaged from the driven gear 114 in the transmission gear train 115 by pulling out the rotary shaft 111 a small distance with the handle wheel 11. Upon rotation of rotary disc 14, the first linking rod 12 and the extension rods 121 and 122 will drive a driven frame 2 mounted on the other ends of the rods 12, 121, and 122 to rotate synchronously with the rotary disc 14. Since the earth supporting rod 63 is fixedly inserted into the hollow post 20 of the driven frame 2, the earth supporting rod 63 will be driven to move along the orbit 33 on the earth orbit base 3 when the driven frame 2 and the rotary disc 14 revolve synchronously. At the same time, the members (the earth and the moon) on the earth supporting rod 63 will be revolve around the rotary disc shaft 132. Since the rotary disc shaft 132 is mounted to a supporting rod 51 of the sun 5, the earth 6 will revolve around the sun 5. Simultaneously, the revolution of the driven frame 2 will drive the earth 6 to rotate as shown in FIG. 3, and also cause the moon 41 to revolve about the earth 6 as shown in FIG. 6. In the automatic operation system, a D.C. motor 116 and a transmission gear train 115 are added. A driven gear 114 being the last gear in the gear train 115 is engaged with a gear 113 on the rotary shaft 111 so as to drive the rotary shaft 111 to rotate (in the embodiment, it rotates at a speed of ½ turns per day); then, the shaft gear 112 on the rotary shaft 111 will drive the rotary disc 14 to rotate (at a speed of 1/365 turns per day as designed in the embodiment). In that case, a pin is put into a pin hole, IIIa of the shaft III so as to have the vertically engaged gear 113 and the driven gear 114 closely engaged by means of a spring 118 mounted between the gear 113 and the bearing block 117. FIG. 2A illustrates the transmission gear train 115, which comprises a worm 1150, and gears 1151-1159. The last gear 114 in the gear train can drive the vertically engaged gear 113 of the rotary shaft 111. The number of teeth of the gears in the gear train are:

gear 1151 . . . M2 36T
gear 1152 . . . M2 10T
gear 1153 . . . M2 60T
gear 1155 . . . M2 60T
gear 1157 . . . M2 60T
gear 1159 . . . M2 60T
   gear 1154 . . . M2 12T
gear 1156 . . . M2 15T
gear 1158 . . . M2 15T
gear 114 . . . M2 12T
gear 113 . . . M2 24T The pitch of the worm 1150 is 6.28 m/m so as to fit the pitch of M2. According to the aforesaid data and engaging relationship, it is clear that the rotating speed of the rotary shaft 111 is 1/2880 RPM, i.e., rotating one turn every 48 hours. The rotating speed of the rotary disc 14 is equal to c.p. 3 m/m eight teeth of the rotary shaft 111, and equal to c.p. 3 m/m of the gear plate 141, i.e., one turn being equal to 1460 teeth; in other words, the rotary disc 14 rotates by four teeth (1/365 turn) in one day. The rotary shaft rotates one turn per 48 hours, and can drive the rotary disc 14 to move eight teeth (48 hours), and upon rotating one-half (½) turn, four teeth have been moved (24 hours).

FIG. 3 illustrates the revoltion transmission structure of the present invention. The driven frame 2 is driven to rotate by means of a power operation mechanism, which also drives the earth 6 to rotate. A glass face 506 of the sun body 5 paces the earth 6 constantly during the earth revolving around the sun. The revolution structure mainly includes a C-shaped member 25 under the driven frame 2. In the member 25, there is a shaft 26, having a lower part formed into a shaft gear 23 that is engaged with a ring gear 24 mounted on the inner side of the earth orbit base 3. Upon the driven frame 2 being pulled by the first linking rod 12 to move along the orbit 33 of the earth orbit base 3, the shaft gear 23 will engage with the ring gear 24 beside the earth orbit base 3 to synchronously rotate a gear 22 on shaft 26. At the same time, the gear 22 will engage with the gear 21 on the earth supporting rod 63 to cause the earth supporting rod 63 to rotate in an opposite direction (to rotate one turn per day). That rotation will cause the earth 6 on the earth supporting rod 63 to rotate one turn per day. The driven frame 2 is fixedly attached to second linking rod 71, of which one end is fixedly attached to a fixed block 72 being fixedly mounted on the sun supporting rod 51. Upon the driven frame 2 driving the earth supporting rod 63 and the earth to move along the orbit 33 on the earth orbit base 3, the linking rod 71 and the fixed block 72 will drive the sun supporting rod 51 to rotate synchronously so as to have the glass face 506 of the sun 5 face towards the earth during the earth's revolution round the sun. This shows that sun shine will radiate towards the earth to generate a day-and-night variation.

Figure 1B:
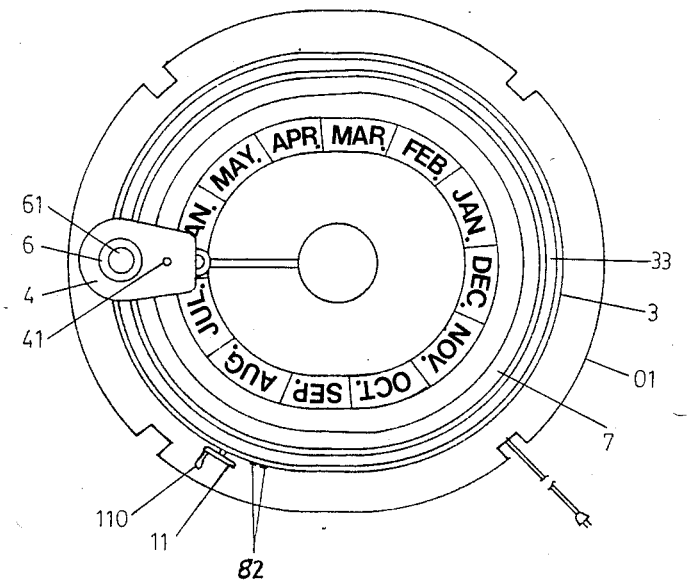
FIG. 1B is a to top view of the embodiment of the present invention.
Figure 1A:
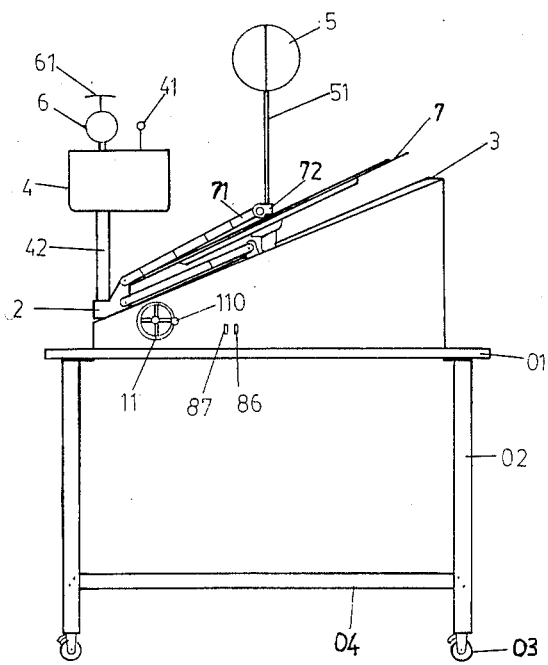
FIG. 1A is a side view of the embodiment according to the present invention.
Figure 6A:
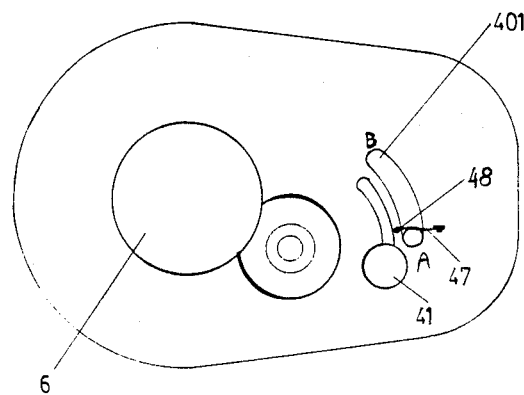
FIG. 6A is a top view of FIG. 6.
Figure 8:
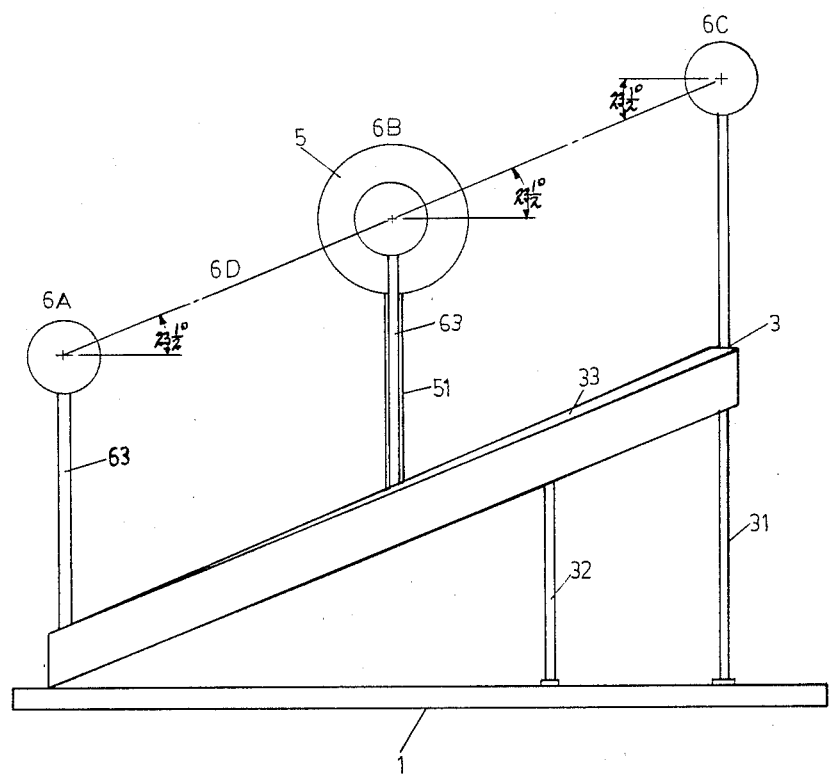
FIG. 8 illustrates the earth positions relative to the sun according to the present invention.
Figure 8A:
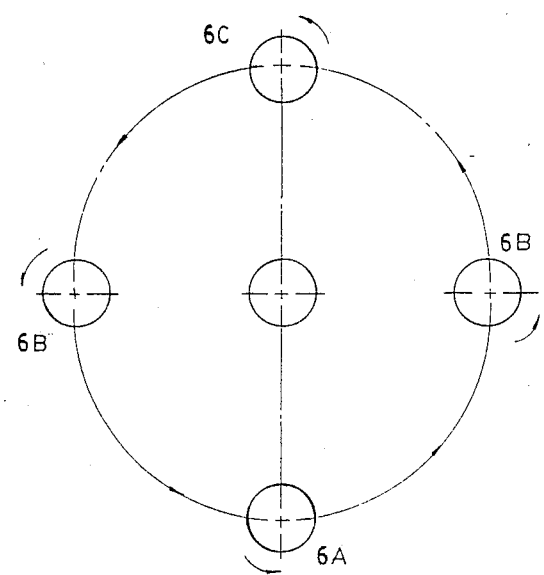
FIG. 8A is a top view of the earth positions relative to the sun according to the present invention.

The plane of the earth orbit base 3 and the rotation axis of the earth (which is vertical in the device) form a contained angle of 66.5 as shown in FIG. 1B and 8 (i.e., forming a contained angle of 23.5° between plane of the earth orbit base 3 and the plane of the earth's equator. In other words, a sloping and oblong orbit base as shown in FIGS. 8A and 6A. The earth orbit base 3 has a recess orbit 33 to receive the lower end of the earth supporting rod 63 therein. The sloping earth orbit base 3 is supported with two supporting rods 31 and 32 on the base board 01 which is horizontal.

FIG. 6 illustrates the transmission structure of the moon 41, which is driven by means of the transmission structure of the earth supporting rod 53 to revolve around the earth 6. The transmission structure of the moon 41 includes a gear box 4 mounted under the earth 6 on the earth supporting rod 63. In order to let the gear box 4 and the earth supporting rod 63 maintain a free rotation with each other, the gear box 4 is mounted around the supporting rod 63 with a bearing 631. The earth supporting rod 63 is rotatably inserted into the gear box supporting cylinder 42. The gear box supporting cylinder 42 is fixedly mounted to a base disc 43 of the moon orbit 431. The disc surface 432 of the base disc 43 has a slope of 5°, which is substantially the orbit sloping angle of moon to the axis of the earth 6. Under the base disc 43, there is an oblong gear 442 fixedly mounted around the gear box supporting cylinder 42, and being engaged with a driven gear 455 of the gear shaft 454. The other end of the gear shaft 454 is fixedly mounted with a gear 453, which is engaged with a driven gear 452 to drive the gear shaft 454 and the driven gear 455 to rotate, whereby the oblong gear 442 is driven to rotate, and in turn, the gear box 4 (including the moon 41) will revolve along the sloping moon orbit 431 of the base disc 43 and around the earth. (The rotation speed of the moon is such that, when the earth rotates on its axis 29½ turns, the moon will revolve once round the earth.). The driven gear 452 on the gear shaft 457 is driven to rotate through gear 451, which is engaged with gear 46 mounted on the earth supporting rod 63. Therefore, upon the earth supporting rod 63 rotating (i.e., the earth rotating), the gear box 4 will, through the aforesaid transmission structure, be driven to revolve about the earth supporting rod 63 along the moon orbit 431 on the base disc 43 so as to let the moon supporting rod 410 and the moon 41 revolve about the earth 6. In order to make necessary adjustment or to make a separate operation in the event of a revolution error or requiring a separate explanation, the cover board 40 is furnished with a curved slot 401 as shown in FIG. 6A. Under normal condition, the top end of the gear shaft 454 that extends above the cover board 40 is positioned at the end B of the curved slot 401. In the event of an necessary adjustment, the top end of the gear shaft 454 will be positioned at the end A of the curved slot 401, and the gear shaft 454 is detained in position by means of a detent member 47 and a stud 48, which are furnished on the cover board 40 beside the curved slot 401. In this case, the driven gear 455 of the gear shaft 454 will disengage from the oblong gear 442 to stop the rotation of the gear box 4 (the rotation of the moon); then, the position of the moon supporting rod 410 (i.e., the gear box 4) or other related position (for example, upon merely explaining the revolution of the moon) can be adjusted. After the adjustment, the detent member 47 is released to allow the gear seat 45 to be pulled back by a tension spring 456 to cause the driven gear 455 to engage with the oblong gear 442 again. In the present invention, many parts and assemblies use shafts or rods on bearings, for which the details are omitted because they are obvious parts. The pulley 441 on the pulley seat 44 under the gear shaft 457 rolls along the moon orbit 431 on the base disc 43 so as to make the gear seat 45 (i.e., the gear box) to revolve.

Figure 4:
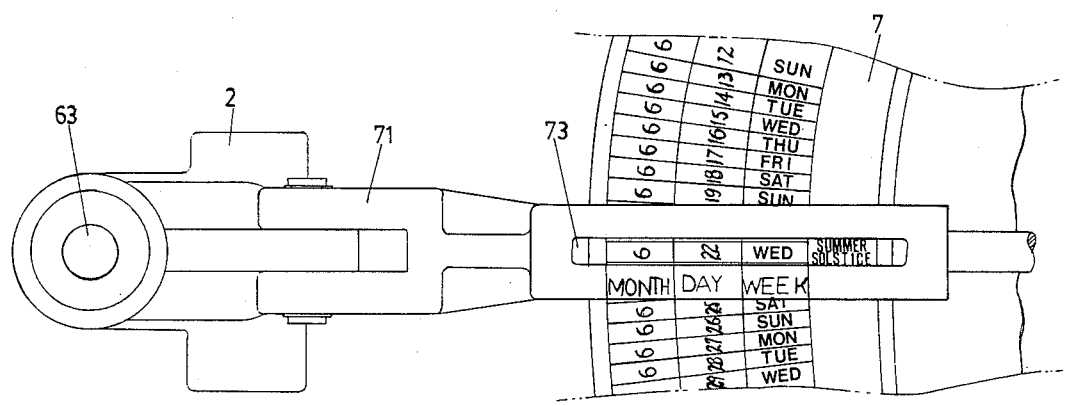
FIG. 4 is an embodiment of a calendar indication device according to the present invention.
Figure 7:
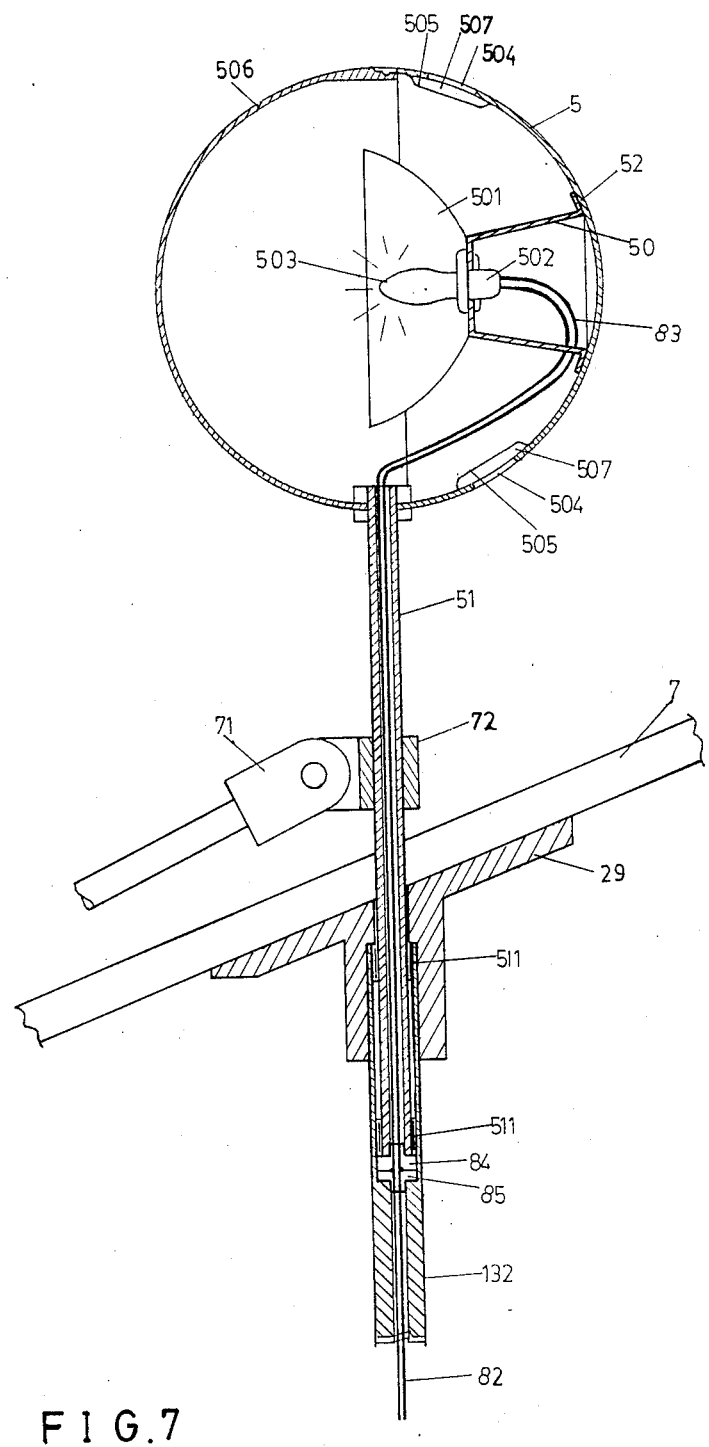
FIG. 7 illustrates the embodiment of the sun structure according to the present invention.

FIG. 7 illustrates the structure of the sun, which is substantially a round ball body 5, of which one half is made of a metal body 52, while the other half part is a glass face 506 so as to allow the light of the bulb 503 in the ball body 5 to radiate towards the earth 6. Both the upper and lower parts of the metal body 52 are furnished with two round holes 504 respectively for dissipating the heat of the bulb 503. In order to prevent the light from leaking via the holes 504 two shades 505 are furnished behind the two holes 504 respectively without affecting the heat dissipating function because of a suitable space 507 being formed behind the holes 504 respectively. In the ball body 5, there are a socket frame 50 and a converging reflector 501 so as to mount the bulb socket 502 in the converging reflector 501. The sun body 5 is mounted on the sun supporting rod 51 that is inserted in a rotary disc shaft 132, and the shaft 132 is driven with a linking rod 71 to rotate. Between the sun supporting rod 51 and the rotary disc shaft 132, there is a calendar disc 7 fixedly mounted on a calendar disc seat 29. The calendar disc 7 is marked with a list to indicate months, days, week days, and festivals as shown in FIG. 4. The date is indicated through the window 73 on the linking rod 71 as the rod 71 moves. Among the sun supporting rod 51, the calendar seat 29, and the rotary disc shaft 132, there is a separate operation or fixed structure. In order to obtain the results expected among these three members, a needle spindle 511 is used as shown in FIG. 7 so as to minimize friction among the parts and to obtain better accuracy. The power wires for the bulb 503 are installed through the hollow core of the sun supporting rod 51 and the rotary disc shaft 132, of which the middle portion is mounted with two contact members 84 and 85 for connecting electrically with the wires 82 and 83 respectively.

Figure 5:
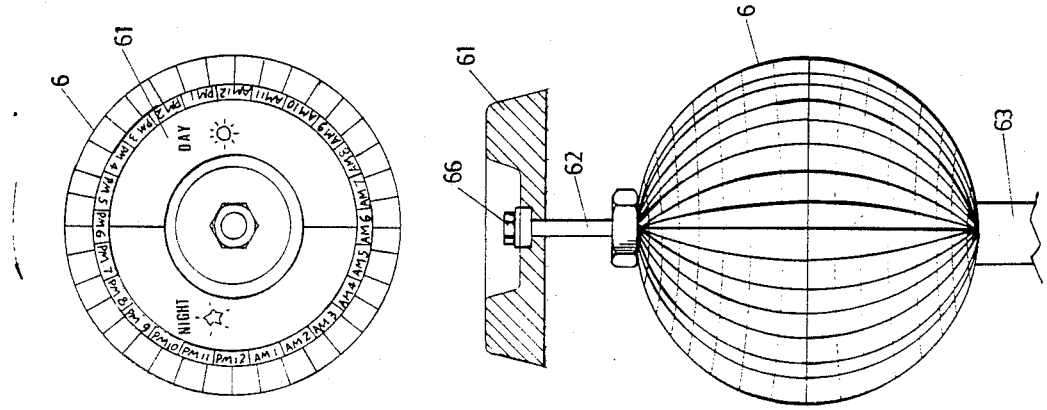
FIG. 5 is a time indication means on a globe according to the present invention.

FIG. 5 illustrates the structure of the earth 6, on which the longitude and latitude are printed (an available globe in the market may be used). The earth 6 is mounted on the earth supporting rod 63 that is movably mounted in the recess orbit 33 of the earth orbit base 3. By means of bearings, the earth supporting rod can smoothly move along the orbit 33 to revolve about the sun 5. In the hollow core of the earth supporting rod 63, there is a slender rod 62, of which the lower end is mounted in the bottom of the earth orbit base 3 by means of a fixing block 64. The top end of the slender rod 62 is mounted with a time disc 61, which is not affected by the rotation of the earth supporting rod 63 so as to accurately indicate the time of various time zones on the earth. The time disc 61 is fixed on the top of the slender rod 62 with a nut 66.

FIG. 4 illustrates the calendar device, which comprises a calendar disc 7 and a linking rod 71. The calendar disc 7 is marked with months, days, week days, and festivals. When the linking rod 71 is moved by the driven frame 2, the date will be shown through the window 73 on the linking rod 71.

Figure 4B:
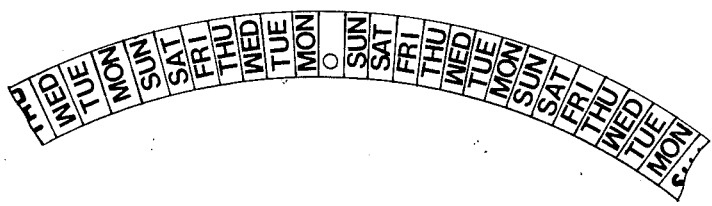
FIG. 4B is an embodiment of a week day disc according to the present invention.
Figure 4A:
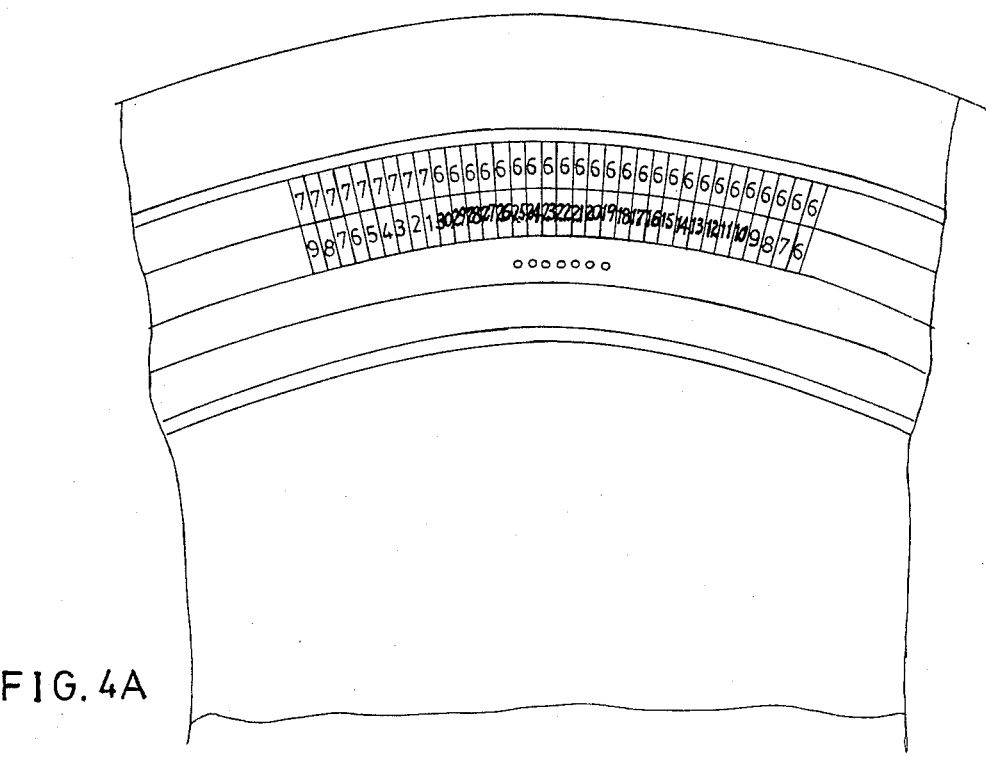
FIG. 4A is an embodiment of a calendar disc according to the present invention.

The calendar disc 7 has two sections. One is the basic section (as shown in FIG. 4A) being fixed to the calendar disc seat 29 on the rotary disc shaft 132. The basic section of the calendar disc has four ring-shaped zones to be marked with a month ring, a day ring (for 365 days not including leapyear), a week ring, on which, in the opposite positions of the summer solstice and the winter solstice, there are seven pin holes being furnished respectively so as to have the weeks on the week ring (shown in FIG. 4B) face exactly the corresponding date by means of two pins to be inserted into the pin hole on the week ring, and into the pin hole on the basic section of the calendar disc respectively. In that case, the date corresponding to the week for a one year period will be set. The most inner ringshaped zone is the "season ring" for indicating the change of the four seasons in one year.

On the calendar disc, there are 365 days marked, and each week has seven days marked, i.e. there are 52 weeks and one day for a year; therefore, the week ring and the day ring have to be adjusted once a year for alignment. By means of two movable sections (the calendar disc and the week disc), it is rather convenient for aligning the date and the week day. The week disc is worked with 365 parts, which are divided into 52 weeks and one day (which is left in blank) as shown in FIG. 4B the upper part of the pin hole being blank, whenever that blank part is encountered in a week in a given year, the two pins have to be pulled out for relocation until the week disc is in alignment with the date desired for at least a one year period.

Figure 9:
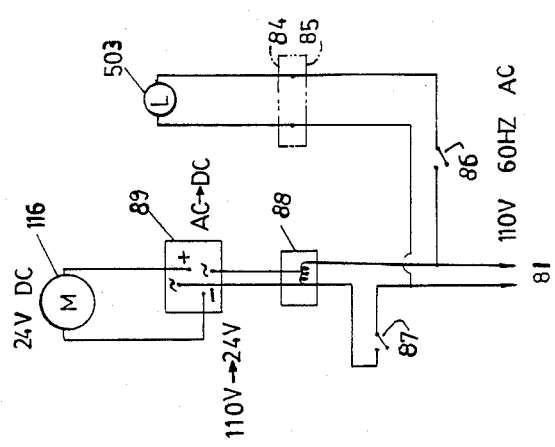
FIG. 9 is an embodiment of the circuit diagram according to the present invention.

The present invention can also be operated with an electric power transmission structure, and the power circuit thereof is shown in FIG. 9, which comprises a power plug 81, a motor switch 87, a bulb switch 86, two contact members 84 and 85, a transformer 88, a rectifier 89, a motor 116, and a sun bulb 503. This system is substantially an auxilliary component that is a general and simple circuit without having any control functions, and its general functions are briefly described as follows:

The driving power of the present invention is a D.C. motor 116 with an input of 24 V. D.C.; the sun bulb 503 for the sun is a general purpose bulb requiring an A.C. power of 110 V. 60 HZ. The sun bulb 503 is connected to a pair contact members 84 and 85 (as shown in FIG. 7), which are connected with co-axial non-rotating conductors. The sun bulb 503 is controlled with a bulb switch 86. A transformer 88 is furnished to convert 110 V. A.C. into 24 V. A.C., which is rectified into 24 V. D.C. for driving the motor 116. In the primary coil circuit of the transformer, a motor switch 87 is installed for controlling the power for the motor.

The integral system of the present invention is shown in FIG. 1A, which is run by two methods, i.e., the manual operation method and power operation method.

In power operation, the globe system including the earth, the sun and the moon can be driven to run automatically by means of the motor 116 (FIG. 2) and the transmission gear train 115, in which the driven gear 114 engages with the vertically engaged gear 113 on the rotary shaft 111. The shaft gear 112 on the rotary shaft 111 engages with the rotary disc 14 that is rotating about the rotary disc shaft 132. Then linking rod 12 of the rotary disc 14 and the extension rod 121 and 122 drive the driven frame 2 and the earth supporting rod 63 along the orbit 33 of the earth orbit base 3 to revolve about the rotary disc shaft 132. Since the rotary disc shaft 132 and the sun supporting rod 51 are rotating co-axially, the earth 6 on the earth supporting rod 63 will revolve about the sun 5 as if the real situation is taking place in the globe system. (In the embodiment of the present invention, the number of teeth of each gear therein is so designed to cause the rotary disc to rotate 1/365 turns per day so as to be corresponding to the earth 5 revolving around the sun 6 counter-clockwise once a gear period, i.e., 365 days.) Since the driven frame 2 is coupled with the linking rod 71 and the fixed block 72, the sun supporting rod 51 and the sun 5 will rotate synchronously so as to have the glass face 506 of the sun 5 always facing earth 6, i.e., resembling the sun shine that radiates towards the earth 6. With the linking rod 71 moving round, the current month, day, and week day on the calendar disc 7 can be indicated in the window 73 on the linking rod. When the driven frame 2 moves round, the shaft gear 23 on shaft 26 in the C-shaped member 25 will rotate because it is engaged with the ring gear 24 beside the earth orbit base 3, and the gear 22 engages with gear 21, and then the earth supporting rod 63 and the earth 6 on the same shaft will rotate in the eastward directon. With the earth supporting rod 63 rotating, the gear 46 thereon will drive the engaged gear 451 and the gear 452 on the same gear shaft 457 will rotate. The gear 452 engages with gear 453 to cause the driven gear 455 on the gear shaft 454 to drive the oblong gear 442, which will drive the gear box 4 will revolve about the earth 5 along the moon orbit 431 on the base disc 43 by means of the pulley 441 under the gear seat 45. (The rotation speed is such that, upon the earth rotating 29½ turns, the moon will revolve about the earth one turn). This revolvtion resembles the real moon as it revolves about the real earth. With the earth 6 rotating about its own axis the time disc 61 can indicate the current time of a given time zone and the difference from the other time zones.

The manual operation method is designed for teaching purposes in a class so as to optionally set the related positions between the earth and the moon. In operation, the user should pull the hand wheel 11 to have the rotary shaft 111 pulled outwards until the vertically engaged gear 113 being disengaged from the driven gear 114 (simultaneously, turn off the power switch). The user also should insert a pin into the pin hole 111b to set the rotary shaft 111 at a fixed position after being pulled out. The user then holds the handle 110 and turns the hand wheel 11 so as to rotate the rotary shaft 111; the operation in the follow steps is the same as that of the power operation except the rotation speed thereof is faster and can be stopped any time at any position for explanation convenience in a class or the like. In the event of merely explaining the moon 41 or making a necessary adjustment, just move the gear shaft 454 extended out above the cover board 40 of the gear box 4 from the end B to end A of the curved slot 401, and use the detent member 47 and the stud 48 to retain the gear shaft 454 at the end A so as to have the driven gear 455 on the gear shaft 454 disengaged from the oblong gear 442; in that case, the gear seat 45 and the moon supporting rod 410 can be adjusted or moved freely.

According to the aforesaid description, the present invention not only can provide a teaching aid in explaining the relation among the earth, the sun and the moon, but also can provide a globe system that combines the calendar and the time indication into one integrated unit.

What is claimed is:

1. A multi-function device globe, comprising:
   a horizontally extending board (01);
   a transmission gear train (115) on said board having a driven gear (114); a motor (116) connected to said gear train for driving said gear train to rotate said driven gear;
   a rotary shaft (111) rotatably mounted to said board and being movable along its own axis to engage said driven gear for rotation of said rotary shaft with rotation of said driven gear, and being movable along its axis for disengagement from said driven gear, said rotary shaft having a shaft gear (112);
   a rotary disc (14) mounted for rotation about a vertical axis to, said board, said rotary disc having a gear plate (141) meshed with said shaft gear for rotation of said rotary disc with rotation of said rotary shaft;
   a hand wheel (11) connected to said rotary shaft for pulling said rotary shaft along its axis to disengage said rotary shaft from said driven gear and for manual rotation of said rotary shaft for rotation of said rotary disc;
   an orbit base (3) connected to said board and defining an earth orbit recess (33) lying in an orbit plane extending at an acute angle to said board;
   an earth supporting rod (63) having a lower end engaged in said orbit recess for movement along said orbit recess; a driven frame (2) mounted to said earth rod for rotation of said earth rod relative to said driven frame;
   an earth structure (6) connected to said earth rod for rotation with said earth rod to simulate rotation of the earth once each day, said earth rod extending vertically with respect to said board, said earth structure having an earth axis axially aligned with said earth rod, said earth rod being at an angle of 66½° to said orbit plane of said orbit recess;

a ring gear (24) connected to said orbit base and extending adjacent to said orbit recess;

an earth rotation shaft (26) having gears meshed with said ring gear and with said earth rod for rotation of said earth rod with movement of said driven frame along said orbit recess;

a sun supporting rod (51) rotatably mounted to said board and extending vertically from said board;

a first linking rod (12) pivotally connected between said rotary disc and said driven frame for movement of said driven frame along said earth orbit recess with rotation of said rotary disc;

a second linking rod (71) pivotally connected between said driven frame and said sun rod for rotating said sun rod with movement of said drive frame along said orbit recess;

a sun structure (5) connected to said sun rod for rotation with said sun rod, said sun structure having a semispherical metal portion (52) and a semispherical transparent portion (506) connected to said semispherical metal portion, said second linking rod holding said sun rod so that said semispherical transparent portion always faces said earth structure;

a light source (503) in said sun structure for casting light on said earth structure through said semispherical transparent portion, said semispherical metal portion having at least two holes (504) therein for dissipating heat generated by said light source;

a gear box supporting cylinder (42) connected to said driven frame and rotatably receiving said earth rod therein;

a gear box (4) connected to said gear box supporting cylinder for rotation around said earth rod;

a gear assembly operatively connected between said supporting cylinder, said gear box and said earth rod for rotating said gear box around said earth rod to simulate the revolution of the moon around the earth;

a moon structure (41) fixed to said gear box for making revolutions around said earth structure; said earth structure comprising a ball-shaped body marked with longitudes and latitudes and being connected to a top of said earth rod;

a slender rod (62) extending axially with said earth rod and through said earth structure and said earth rod to said orbit recess;

a block (64) in said orbit recess for non-rotating sliding movement along said earth orbit recess, said slender rod having a lower end fixed to said block;

a time disc (61) fixed to a top end of said slender rod above said earth structure and carrying markings for indicating a time of day for said earth structure as said earth structure rotates on its axis and with said earth rod;

a calendar disc (7) being marked with months, days and weekdays and fixed with respect to said orbit base and lying in a plane parallel to said orbit plane;

said second linking rod having a window therein alignable with said markings of said calendar disc to indicate the month, day and weekday of a position of said earth structure on said orbit recess around said sun structure; and electric power means connected to said light source and said motor for powering said light source and said motor.

2. A device according to claim 1 including a vertically extending gear (113) fixed to said rotary shaft (111), a bearing block (117) fixed to said board and rotatably carrying said rotary shaft, a spring (118) engaged between said bearing block and said vertically extending gear for biasing said gear into meshing engagement with said driven gear (114), and pin means (111a) engagable with said rotary shaft after said rotary shaft has been pulled axially to disengage said vertically extending gear from said driven gear, to hold said rotary shaft with said vertically extending gear away from said driven gear.

3. A device according to claim 1 wherein said gear box (4) includes a cover board having a curved slot therein, said gear assembly including an oblong gear (442) connected to said supporting cylinder and a moon revolving shaft (454) having a gear (455) meshed with said oblong gear in a first position of said moon revolving shaft, said moon revolving shaft having an end extending into said curved slot and being movable along said curved slot to a second position with said gear of said moon revolving shaft being disengaged from said oblong gear for adjusting the rotational position of said gear box and said moon structure, around said earth structure and a detent member operatively connected between said cover board and said moon revolving shaft for retaining said moon revolving shaft with its gear in engagement with said oblong gear.

4. A device according to claim 3 including a moon orbit member fixed to said supporting cylinder and having a moon orbit recess therein, said gear assembly including a pulley for engagement in said moon orbit recess for raising and lowering said gear box as it revolves around said earth, said moon orbit recess extending at an angle of about 5° to the axis of said earth rod for causing the vertical movement of said moon structure as it revolves around said earth structure.

* * * * *